Nov. 24, 1953 A. H. MALLON 2,660,457
TELESCOPIC HANDLE
Filed April 14, 1950

ADELAIDE H. MALLON
INVENTOR
BY Joseph Blacker
ATTORNEY

Patented Nov. 24, 1953

2,660,457

UNITED STATES PATENT OFFICE 2,660,457

TELESCOPIC HANDLE

Adelaide H. Mallon, New York, N. Y.

Application April 14, 1950, Serial No. 155,836

4 Claims. (Cl. 285—175)

This invention relates to improvements in devices for detachably securing sections of tubes and particularly to a telescopic handle to be used for vacuum cleaners, brooms, mops, carpet sweepers, flag staffs, and in general to any tubular sectional extension handle requiring it to be telescopic, especially where two or more slidable tubes of unequal size are required to be detachably secured.

An object of this invention is to provide a telescopic junction for two tubes of unequal size sliding over one another, wherein the outer tube has a bayonet slot at one end and the inner tube has a spring-supported stud pin of a size adapted to enter the bayonet slot in slidable engagement, and particularly to a structure wherein each of the tubes has a rectangular slot respectively in alignment with each other, and the spring having a radially positioned extension adapted to enter the aligned slots and form an interlock which keeps the tubes from disengagement even when subjected to a great deal of vibration or shock.

Another object of this invention is to provide a telescopic junction for hollow tubular sections which when assembled provides an air-tight junction permitting efficient conveyance of a fluid through the jointed tubes.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 2:
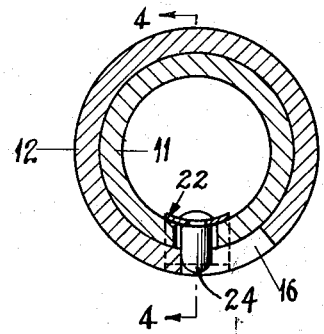
Figure 2 is a cross-sectional view taken on line 2—2 in Figure 1.

In the illustrated embodiment of the invention, the numeral 10 indicates a telescopic junction for sections of pipes, tubes and the like. The junction 10 comprises an inner tube 11 and an outer tube 12.

The outer tube 12 has a bayonet slot 13 open at one edge 14 of the tube and comprising a slot portion 15 lengthwise of the tube and a slot portion 16 which is positioned crosswise of the tube. The tube 12 has a rectangular locking slot 17 therethrough.

The inner tube 11 has an end portion 20 formed with a rectangular guiding slot 21. A leaf spring 22 is fixed to the tube 11 by rivets 23. The spring 22 has a stud pin 24 fixed thereto at its free end portion and adapted to enter the bayonet slot 13.

The spring 22 has a radially extending arcuate portion 25 adapted to pass through the guiding slot 21 and to enter the locking slot 17 in interlocked frictional engagement between the arcuate sides of the spring and the sides of the slot when the stud pin 24 is at the inner end of the bayonet slot 13.

It is to be noted that the stud pin 24 is in frictional engagement in the horizontal portion 16 of the bayonet slot 13 and this maintains the tubular sections 11 and 12 from movement lengthwise of the tubular sections. It is also to be noted that the sides of the arcuate portion 25 of the spring 22 are in close and frictional engagement in the locking slot 17 and this maintains the tubular sections 11 and 12 from movement crosswise of the tubular sections. This combination of a spring mounted stud pin functioning in a bayonet slot and an arcuate spring portion functioning in a locking slot provides a double interlock which keeps the tubes from disengagement even when subjected to a great deal of vibration or shock.

Figure 1:
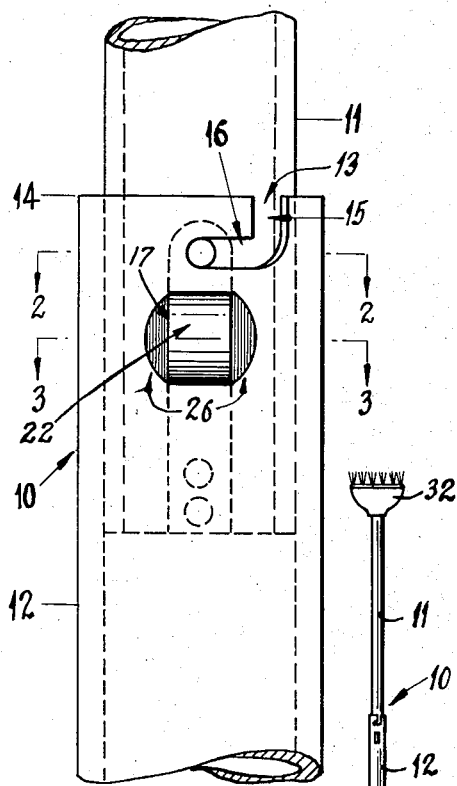
Figure 1 is a front view of a fragmentary portion of two relatively slidable tubes formed with the telescopic junction.

As shown in Figure 1, it will be seen that there is no clearance between the side walls of the spring 22 and the adjoining side walls of the slot 17. This close relation prevents any leakage of air into the tubes 11 and 12, in the extended position of the tubes.

As shown in Figure 2, it will be seen that the spring 22 is of arcuate cross-section at both ends. The upper end carrying the pin 24 seats in close relation against the inner surface of the tube 11. This close relation prevents any leakage of air around the pin 24 and into the tubes 11 and 12, in the extended position of the tubes.

Figure 3:
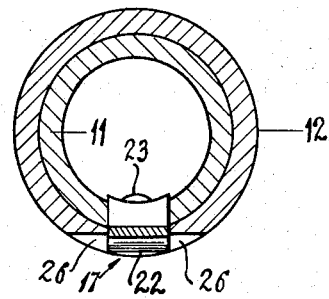
Figure 3 is a cross-sectional view taken on line 3—3 in Figure 1.
Figure 4:
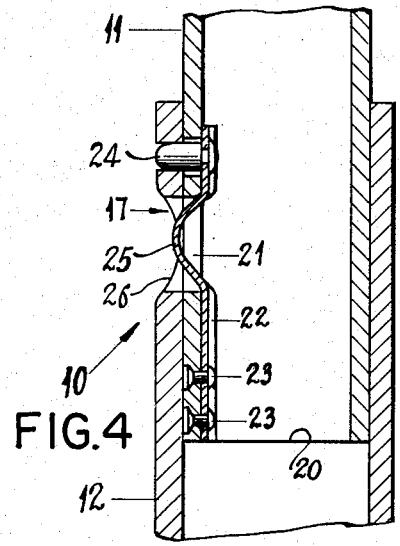
Figure 4 is a cross-sectional view taken on line 4—4 in Figure 2.

As shown in Figures 1, 3 and 4, the outer surface of the tubular section 12 at the locking slot 17 is cut away at 26 to permit the user to easily press the arcuate spring portion 25 inwardly, sufficiently to move the stud pin 24 clear of the bayonet slot 13, thereby unlocking the double interlock and permitting the telescoping or separation of the sections from each other.

Figure 5:
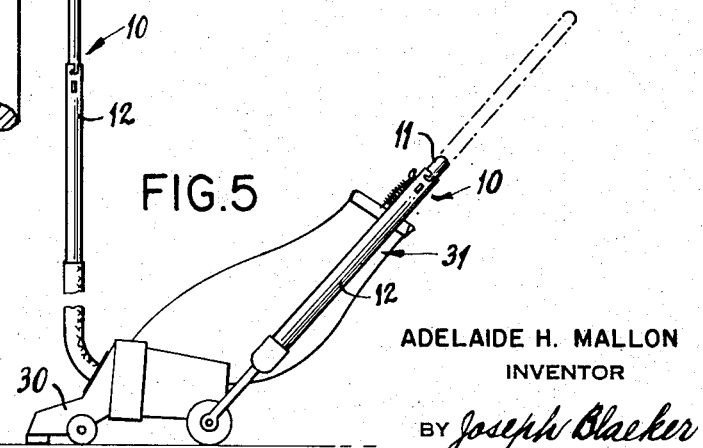
Figure 5 is a side elevation of a vacuum cleaner showing two applications of the telescopic junction.

Figure 5 is a side elevation of a vacuum cleaner 30 showing two applications of the telescopic junction 10. As shown, the handle 31 of the vacuum cleaner consists of the outer tube 12 and the inner tube 11. The inner tube 11 is telescoped in entirety into the outer tube 12 substantially along its entire length to form a short handle thereby adapting the vacuum cleaner for use on stairs, etc. As shown in dot-and-dash lines, the inner section 11 may be extended outwardly to substantially its full length.

Figure 5 also shows the suction tube of the vacuum cleaner having the two tubular sections 11 and 12 inserted therein in extended relation, the tube 11 having a brush 32 secured thereto and to be used when cleaning ceilings.

While the telescopic junction 10 is adapted for various types of vacuum cleaners, it may also be used for sectional masts, sectional poles, etc. Also for telescopic extensible and contractible television antenna poles.

In operation, the bayonet slot serves for inserting one tubular section into another tubular section in a positive and quick manner. The stud pin is inserted into the bayonet slot of the outer tubular section and the section turned as guided by the contour of the bayonet slot till the spring portion 25 snaps into the locking slot 17.

The advantages of the telescopic junction 10 is that it serves for saving storage space of tubular sections. The sections occupy less room when transporting appliances having the tubular junction 10.

In accordance with the patent statutes I have described and illustrated the preferred embodiment of my invention, but it will be understood that various changes and modifications can be made therein without departing from the spirit of the invention as defined by the appended claims.

I claim:

1. A telescopic junction for tubular sections made of two hollow tubes of unequal diameters and slidable relative to one another so as to be telescoped in entirety one within the other, comprising a tube having an end portion formed with a bayonet slot open at an edge of the tube and having a rectangular locking slot through said tube, the other tube having an end portion formed with a rectangular guiding slot and a pivotally mounted resilient locking means fixed thereto at one end, said locking means having a stud pin fixed thereto at its free end, said resilient locking means having a radially extending locking portion adapted to pass through said guiding slot and to enter said locking slot when said stud pin is at the inner end of said bayonet slot, said locking means being in close fitting airtight relation in said locking slot while leaving the opening through said tubes substantially unrestricted, thereby adapting said telescopic junction as an efficient conveyance of a fluid, said arcuate locking means being movable inwardly insufficiently to clear said outer tube thereby providing unobstructed peripheral contacting surfaces between said tubes whereby free relative sliding motion is permitted for the entire length of said tubes.

2. A telescopic junction for tubular sections made of two hollow tubes of unequal diameters and slidable relative to one another so as to be telescoped in entirety one within the other, comprising a tube having an end portion formed with a bayonet slot open at an edge of the tube and having a rectangular locking slot through said tube, the other tube having an end portion formed with a rectangular guiding slot and a pivotally mounted leaf spring fixed thereto at one end, said leaf spring having a stud pin at its free end and adapted to enter said bayonet slot, said spring locking means having a radially extending locking portion adapted to pass through said guiding slot and to enter said locking slot in air-tight interlocked engagement when said stud pin is at the inner end of said bayonet slot, said junction being detachable by forcing said radial locking portion of said spring inwardly of said tubular sections so as to be telescoped in entirely one within the other.

3. A telescopic junction for tubular sections made of two hollow tubes of unequal diameters and slidable relative to one another so as to be telescoped in entirety one within the other, comprising an outer tube having an end portion formed with a bayonet slot open at an end portion of the tube, said outer tube having a rectangular locking slot adjacent to said bayonet slot, the inner tube having an end portion formed with a rectangular guiding slot and a pivotally mounted leaf spring fixed at one end to said inner tube and having a stud pin fixed thereto at its free end, said pin being adapted to enter said bayonet slot, said spring having a radially extending arcuate locking portion intermediate said stud pin and the pivotal end portion thereof, said radially extending locking portion being adapted to pass through said guiding slot and to enter said locking slot in air-tight interlocked engagement when said stud pin is at the inner end of said bayonet slot, said spring mounted stud pin and said radially extending locking portion of said spring jointly providing a double interlock of said tubes preventing disengagement when subjected to vibration or shock, said arcuate locking means being movable inwardly sufficiently to clear said outer tube thereby providing unobstructed peripheral contacting surfaces between said tubes whereby free relative sliding motion is permitted for the entire length of said tubes.

4. A telescopic junction made of two hollow tubes of unequal diameters and slidable relative to one another, comprising an outer tube having an end portion formed with a bayonet slot open at an edge of the tube and having a rectangular locking slot through said tube, the inner tube having an end portion formed with a rectangular guiding slot and a leaf spring fixed thereto in pivotally mounted relation, said spring having a stud pin at its free end adapted for engagement with said bayonet slot, said spring having a radially extending arcuate locking portion adapted to pass through said guiding slot and enter said locking slot when said stud pin is at the inner end of said bayonet slot, said arcuate portion being in close fitting and air-tight sealing relation in said locking slot while leaving the opening through said tubes substantially unrestricted, said spring mounted stud pin and said radially extending arcuate locking portion of said spring jointly providing a double interlock of said tubes preventing disengagement when subjected to vibration, thereby adapting said telescopic junction as a union of detachable tubes for the air-tight conveyance of a fluid.

ADELAIDE H. MALLON.

References Cited in the file of this patent

UNITED STATES PATENTS

| Number | Name | Date |
|---|---|---|
| 695,353 | Turner | Mar. 11, 1902 |
| 1,006,427 | Boraks | Oct. 17, 1911 |
| 2,190,882 | Pardee | Feb. 20, 1940 |
| 2,245,151 | Martinet | June 10, 1941 |
| 2,252,132 | Mazveskas | Aug. 12, 1941 |
| 2,280,728 | Streib | Apr. 21, 1942 |
| 2,527,256 | Jackson | Oct. 24, 1950 |